United States Patent
Maxim, Jr. et al.

(10) Patent No.: US 6,762,269 B1
(45) Date of Patent: *Jul. 13, 2004

(54) HIGH TEMPERATURE VISCOSITY STABLE THICKENER

(75) Inventors: Joseph S. Maxim, Jr., Chattanooga, TN (US); James C. Long, Chattanooga, TN (US); Daniel W. Verstrat, Ooltewah, TN (US)

(73) Assignee: National Starch and Chemical Investment Holding Corporation, New Castle, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 416 days.

This patent is subject to a terminal disclaimer.

(21) Appl. No.: 09/133,691

(22) Filed: Aug. 13, 1998

(51) Int. Cl.$^7$ .................. C08F 216/16; C08F 216/18; C08F 220/06; C08F 220/10

(52) U.S. Cl. ............... 526/332; 524/827; 524/832; 524/833; 526/307.5; 526/307.6; 526/318.41; 526/318.44; 526/320; 526/329.6; 526/333

(58) Field of Search .................. 524/804, 839, 524/832, 813, 833, 827, 307.5, 307.6; 526/320, 322, 333, 329.6, 318.41, 318.44

(56) References Cited

U.S. PATENT DOCUMENTS

| | | | | |
|---|---|---|---|---|
| 4,268,641 A | * | 5/1981 | Koenig et al. | 525/367 |
| 4,351,754 A | * | 9/1982 | Dupré | 524/445 |
| 4,384,096 A | | 5/1983 | Sonnabend | 526/313 |
| 4,421,902 A | | 12/1983 | Chang et al. | 526/317 |
| 4,616,074 A | * | 10/1986 | Ruffner | 526/318 |
| RE33,156 E | | 1/1990 | Shay et al. | 526/301 |
| 5,294,692 A | * | 3/1994 | Barron et al. | 526/301 |
| 5,461,100 A | * | 10/1995 | Jenkins et al. | 524/388 |
| 5,661,206 A | * | 8/1997 | Tanaka et al. | 524/378 |

FOREIGN PATENT DOCUMENTS

WO    WO 97/00275    1/1997

* cited by examiner

Primary Examiner—Kelechi C. Egwim
(74) Attorney, Agent, or Firm—Thomas F. Roland

(57) ABSTRACT

A hydrophobe-containing alkali soluble or swellable copolymer thickener comprising an emulsion polymerization product of (A) an ethylenically unsaturated copolymerizable surfactant monomer having a cloud point of from about 65° C. to about 95° C., wherein the surfactant monomer has the formula $$M(EO)_x(BO)_zOR^1$$

wherein M is a residue selected from the group consisting of an ethylenically unsaturated carboxylic acid, and an ethylenically unsaturated dicarboxylic acid, EO is an ethylene oxide unit; BO is a butylene oxide unit; x is from 10 to 45; z is from 5 to 35; provided that x+z is from 20 to 45; and $R^1$ is selected from the group consisting of alkyl, alkylene, cycloalkyl, cycloalkylene, and arylalkyl group wherein the alkyl group has 1 to 4 carbon atoms; (B) an α,β-ethylenically unsaturated monocarboxylic acid monomer; and (C) a nonionic α,β-ethylenically unsaturated monomer. The copolymer provides aqueous compositions with constant or increased viscosity at temperatures approaching 120° C.

11 Claims, 2 Drawing Sheets

HIGH TEMPERATURE VISCOSITY STABLE THICKENER

FIELD OF THE INVENTION

This invention relates to a hydrophobe-containing alkali soluble or swellable copolymer thickener prepared from an ethylenically unsaturated copolymerizable surfactant monomer having a cloud point of 65° C. to 95° C. Aqueous compositions utilizing the copolymer exhibit constant or increased viscosity at temperatures approaching 120° C.

BACKGROUND OF THE INVENTION

Alkali soluble polymeric thickeners are described in U.S. Pat. No. 4,384,096, U.S. Re. Pat. No. 33,156, and U.S. Pat. Nos. 4,616,074. 4,384,096 describes alkali soluble polymeric thickeners which are aqueous emulsion copolymers of a α,β-ethylenically unsaturated carboxylic acid monomer, a nonionic α,β-ethylenically unsaturated comonomer, and a copolymerizable nonionic vinyl surfactant esters. U.S. Re. Pat. No. 33,156 describes alkali soluble polymeric thickeners which are aqueous emulsion copolymers of a α,β-ethylenically unsaturated carboxylic acid monomer, a nonionic α,β-ethylenically unsaturated monomer, and a nonionic urethane monomer. U.S. Pat. No. 4,616,074 describes alkali soluble polymeric thickeners which are aqueous emulsion copolymers of an addition copolymerizable substituted methylene succinic acid ester surfactant monomer, an α,β-ethylenically unsaturated carboxylic acid monomer, and a nonionic α,β-ethylenically unsaturated monomer.

The disadvantage of the above described alkali soluble polymeric thickeners is that at temperatures as low as 25° C., the viscosity of the thickeners begins to decrease and continues to decrease at an increasing rate as the temperature is further increased. Such decreasing viscosity properties exhibited by the thickeners at elevated temperatures severely limits the choice of applications for the alkali soluble thickeners. Therefore, it would be advantageous to develop a thickener wherein the viscosity of the thickener does not decrease at elevated temperatures.

SUMMARY OF THE INVENTION

Accordingly, it is an object of the invention to provide an alkali soluble or swellable thickened aqueous composition.

It is another object of the invention to provide a thickened aqueous composition in which the viscosity of the composition does not decrease at elevated temperatures.

It is also an object of the invention to provide a thickened aqueous composition in which the viscosity of the composition is constant or increases while being exposed to elevated temperatures.

With regard to the foregoing and other objects, the present invention provides a hydrophobe-containing alkali soluble or swellable copolymer thickener which provides aqueous compositions with constant or increased viscosity at temperatures approaching 120° C., wherein said copolymer comprises an emulsion polymerization product of (A) from about 0.1 to about 25 weight percent, based on the total weight of the copolymer, of an ethylenically unsaturated copolymerizable surfactant monomer having a cloud point of from about 65° C. to about 95° C., wherein the surfactant monomer has the formula $$M(EO)_x(PO)_y(BO)_zOR^1$$

wherein M is a residue selected from the group consisting of an ethylenically unsaturated carboxylic acid, ethylenically unsaturated dicarboxylic acid, and a copolymerizable isocyanate; EO is an ethylene oxide unit; PO is a propylene oxide unit; BO is a butylene oxide unit; x is from 10 to 45; y is from 0 to 35; z is from 0 to 35; provided that x+y+z is from 20 to 45; and $R^1$ is selected from the group consisting of alkyl, alkylene, cycloalkyl, cycloalkylene, and arylalkyl group wherein the alkyl group has 1 to 30 carbon atoms;

(B) from about 20 to about 70 weight percent, based on the total weight of the copolymer, of an α,β-ethylenically unsaturated monocarboxylic acid monomer having the formula

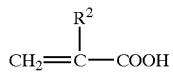

wherein $R^2$ is selected from the group consisting of hydrogen, an alkyl group having 1 to 4 carbon atoms, and —$CH_2COOR^3$; and $R^3$ is hydrogen or an alkyl group having 1 to 4 carbon atoms; and (C) from about 10 to about 70 weight percent, based on the total weight of the copolymer, of a nonionic α,β-ethylenically unsaturated monomer having the formula

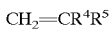

wherein $R^4$ is selected from the group consisting of hydrogen, methyl and Cl; and $R^5$ is selected from the group consisting of CN, Cl, —$COOR^6$, —$C_6H_4R^7$, —$CH=CH_2$,

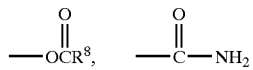

wherein $R^6$ is selected from the group consisting of hydrogen, Cl, Br, and an alkyl group having 1 to 4 carbon atoms; $R^7$ is an alkyl group having 1 to 12 carbon atoms or a hydroxyalkyl group having 2 to 8 carbon atoms; and $R^8$ is an alkyl group having 1 to 8 carbon atoms.

According to another aspect the invention provides a method for making a thickened aqueous composition wherein said method comprises: (I) preparing a copolymer as described above; (II) combining the copolymer prepared in Step (I) with a composition comprising water at a pH of from about 2 to about 5 to form an aqueous copolymer dispersion; and (III) at least partially neutralizing said aqueous copolymer dispersion prepared in Step (II) to a pH of at least about 5.5 to form a hydrophobe-containing alkali soluble or swellable thickened aqueous composition which exhibits constant or increased viscosity at temperatures approaching 120° C.

The hydrophobe-containing alkali soluble or swellable copolymer thickeners of the invention thicken aqueous compositions and maintain or increase the viscosity of the thickened aqueous composition at temperatures approaching 120° C. Thus, the copolymer thickeners of the invention exhibit enhanced thickening efficiency in comparison with prior art copolymers. In addition, a reduced quantity of copolymer thickener is required to achieve a fixed level of thickening in comparison with the amount of prior art thickeners.

BRIEF DESCRIPTION OF THE DRAWINGS

The above and other features of the invention will be further described in the following detailed specification considered in conjunction with the accompany drawings in which.

DESCRIPTION OF THE INVENTION

Figure 1:
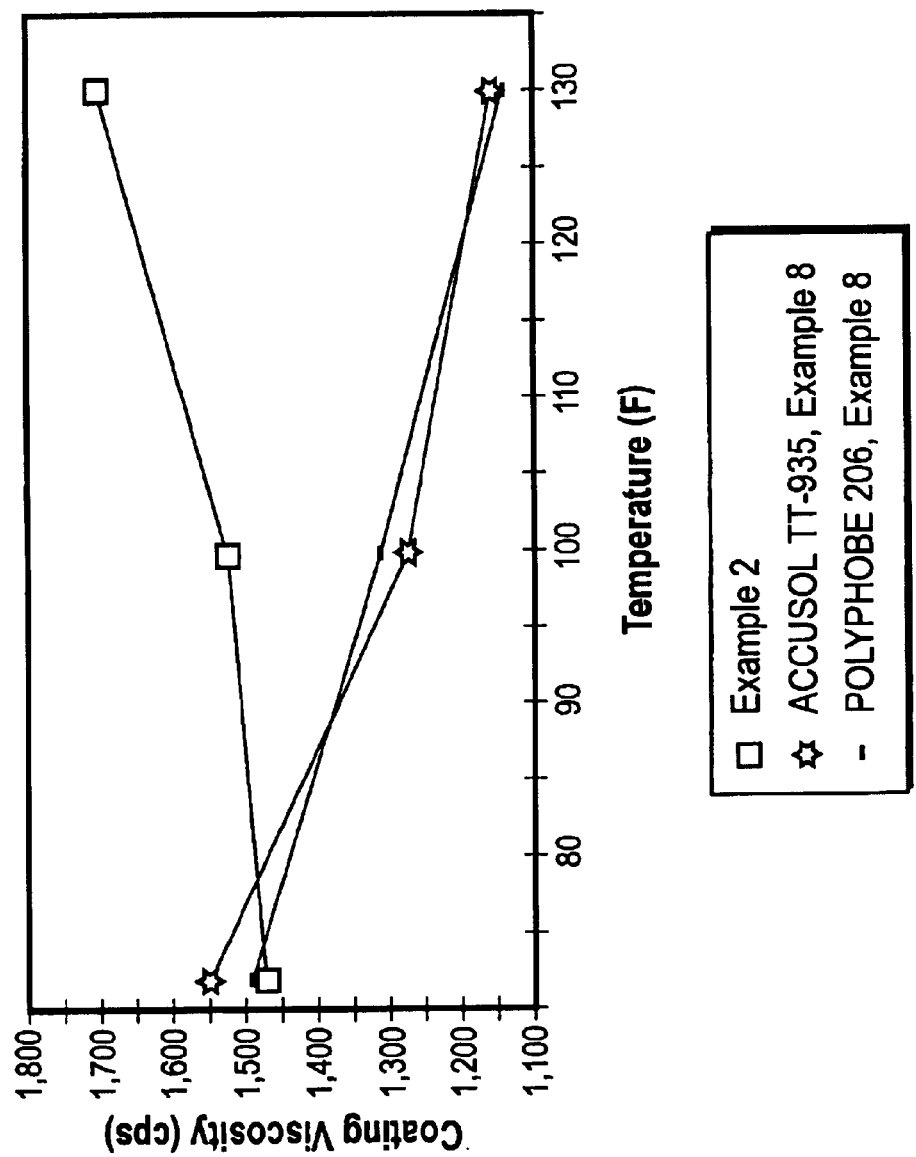
FIG. 1 is a graph which plots viscosity vs. temperature for a series of copolymers including the copolymers of the invention and commercially available copolymer thickeners.

The hydrophobe-containing alkali soluble or swellable thickener composition of the invention comprises a copolymer which comprises the emulsion polymerization product of (A) an ethylenically unsaturated copolymerizable surfactant monomer having a cloud point of from about 65° C. to about 95° C., (B) an α,β-ethylenically unsaturated monocarboxylic acid monomer, and (C) a nonionic α,β-ethylenically unsaturated monomer. Optionally, the hydrophobe-containing alkali soluble or swellable thickener composition may contain a crosslinking monomer (D).

The ethylenically unsaturated copolymerizable surfactant monomer (A) has a cloud point of from about 65° C. to about 95° C., preferably from about 75° C. to about 90° C., most preferably from about 82° C. to about 86° C. As used herein, "cloud point" refers to the temperature at which a 1 weight percent solution, based on solids, of the surfactant monomer in deionized water phase separates from the water resulting in an opaque, hazy, or translucent mixture or suspension. In the situation where the cloud point occurs over a broad temperature range which may occur when a combination of surfactant monomers is used, the midpoint of the temperature range is accepted as the cloud point.

The ethylenically unsaturated copolymerizable surfactant monomer (A) has the formula $$M(EO)_x(PO)_y(BO)_zOR^1$$

wherein M is a residue selected from an ethylenically unsaturated carboxylic acid, ethylenically unsaturated dicarboxylic acid, or a copolymerizable isocyanate; EO is an ethylene oxide unit; PO is a propylene oxide unit; BO is a butylene oxide unit; x is from 10 to 45; y is from 0 to 35; z is from 0 to 35; provided that x+y+z is from 20 to 45; and $R^1$ is selected from alkyl, alkylene, cycloalkyl, cycloalkylene, and arylalkyl group wherein the alkyl group has 1 to 30 carbon atoms.

The surfactant monomer is obtained by reacting an alcohol terminated nonionic surfactant having a $C_{20}$ to $C_{30}$ hydrophobic moiety with a carboxylic acid, dicarboxylic acid, copolymerizable isocyanate, or combination thereof, by a conventional acid catalyzed reaction techniques. Suitable carboxylic acids and dicarboxylic acids include aromatic carboxylic acids and dicarboxylic acids preferably having 8 to 14 carbon atoms, saturated aliphatic carboxylic acids and dicarboxylic acids preferably having 4 to 12 carbon atoms, and cycloaliphatic carboxylic acids and dicarboxylic acids preferably having 8 to 12 carbon atoms. Specific examples of carboxylic acids and dicarboxylic acids are: methacrylic acid, acrylic acid, terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and itaconic acid. The most preferred carboxylic acid is methacrylic acid and the most preferred dicarboxylic acid is itaconic acid. The surfactant monomer may be prepared from two or more of the above copolymerizable carboxylic acids and/or dicarboxylic acids.

It should be understood that use of the corresponding acid anhydrides, esters, and acid chlorides of these acids is included in the term "carboxylic acid" and "dicarboxylic acid".

The copolymerizable isocyanate may be prepared by reacting a monohydric nonionic surfactant with a monoethylenically unsaturated monoisocyanate. Alternatively, the copolymerizable isocyanate may be prepared by reacting equimolar proportions of an organic diisocyanate with an hydroxy ester of a $C_2$–$C_4$ monoepoxide with acrylic acid or methacrylic acid. The copolymerizable isocyanate is preferably selected from alpha,alpha-dimethyl-m-isopropenyl benzyl isocyanate and isocyanatoethylmethacrylate.

The nonionic surfactants are characterized by the presence of a hydrophobic group and an organic hydrophilic group. The nonionic surfactants are typically prepared by reacting an organic aliphatic or alkyl aromatic hydrophobic compound with ethylene oxide (hydrophilic in nature) or with a combination of ethylene oxide and propylene oxide and/or butylene oxide. Examples of nonionic surfactants which can be reacted with a carboxylic acid, dicarboxylic acid, and/or copolymerizable isocyanate are polyoxyethylene alcohols such as poly(oxyethylene)20 stearyl ether and poly(oxyethylene)lauryl ether; ethoxylated alkyl phenols such as poly(oxyethylene)3 nonylphenol and poly(oxyethylene)8 dinonyl phenol; polyoxyethylene fatty acid esters such as poly(oxyethylene)8 stearate and poly(oxyethylene)40 stearate, sorbitan fatty acid esters, such as sorbitan monooleate and sorbitan monostearate, polyoxyethylene sorbitan fatty acid esters, such as poly(oxyethylene)20 sorbitan monolaurate and poly(oxyethylene)40 monostearate.

The surfactant monomer is present in the copolymer in an amount of from about 0.1 to about 25 weight percent, preferably from about 1 to about 10 weight percent, and more preferably from about 2 to about 5 weight percent, based on the total weight of the copolymer.

The α,β-ethylenically unsaturated monocarboxylic acid monomer (B) has the formula $$CH_2=\underset{\underset{R^2}{|}}{C}-COOH$$

wherein $R^2$ is selected from hydrogen, an alkyl group having 1 to 4 carbon atoms, and —$CH_2COOR^3$; and $R^3$ is hydrogen or an alkyl group having 1 to 4 carbon atoms. Examples of α,β-ethylenically unsaturated monocarboxylic acid monomers are carboxylic acids such as acrylic, methacrylic, crotonic, and acyloxypropionic acid. It is within the scope of the invention to replace up to 10 weight percent, based on the weight of the α,β-ethylenically unsaturated monocarboxylic acid monomer (B), with a dicarboxylic acid or a monoester of a dicarboxylic acid. Most preferably, the α,β-ethylenically unsaturated monocarboxylic acid monomer is selected from methacrylic acid and acrylic acid.

The α,β-ethylenically unsaturated monocarboxylic acid monomer is present in the copolymer in an amount of from about 20 to about 70 weight percent, preferably from about 30 to about 60 weight percent, and more preferably from about 40 to about 50 weight percent, based on the total weight of the copolymer.

The nonionic α,β-ethylenically unsaturated monomer (C) has the formula $$CH_2=CR^4R^5$$

wherein $R^4$ is selected from hydrogen, methyl and Cl; and $R^5$ is selected from CN, Cl, —$COOR^6$, —$C_6H_4R^7$, —$CH=CH_2$, $$-O\overset{O}{\overset{\|}{C}}R^8, \quad -\overset{O}{\overset{\|}{C}}-NH_2$$

wherein $R^6$ is selected from hydrogen, Cl, Br, and an alkyl group having 1 to 4 carbon atoms; $R^7$ is an alkyl group having 1 to 12 carbon atoms or a hydroxyalkyl group having 2 to 8 carbon atoms; and $R^8$ is an alkyl group having 1 to 8 carbon atoms.

Examples of nonionic α,β-ethylenically unsaturated monomers are $C_1$–$C_8$ alkyl and $C_2$–$C_8$ hydroxyalkyl esters of acrylic and methacrylic acids, such as methyl acrylate, ethyl acrylate, butyl acrylate, 2-ethyl hexyl acrylate, methyl methacrylate, ethyl methacrylate, butyl methacrylate, 2-hydroxybutyl acrylate, 2-hydroxyethyl methacrylate, 2-hydroxypropyl methacrylate, styrene, butadiene, isoprene, vinyl chloride, vinylidene chloride, acrylonitrile, methacrylonitrile, vinyl acetate, vinyl butyrate, vinyl caprolate, p-chloro styrene, isopropyl styrene, and vinyl toluene. More preferably, the nonionic α,β-ethylenically unsaturated monomer is an acrylate or methacrylate ester alone or mixtures thereof with styrene, acrylonitrile, or vinyl acetate. Most preferably, the nonionic α,β-ethylenically unsaturated monomer is ethyl acrylate.

The nonionic α,β-ethylenically unsaturated monomer is present in the copolymer in an amount of from about 10 to about 70 weight percent, preferably from about 20 to about 50 weight percent, and more preferably from about 30 to about 40 weight percent, based on the total weight of the copolymer.

Optionally, the copolymers may be prepared with a crosslinking monomer (D). If present, the crosslinkihg monomer is preferably present in an amount of from about 0.01 to about 1 weight percent, based on the total weight of the copolymer. Suitable crosslinking monomers include diallyl phthalate, vinyl crotonate, allyl methacrylate, divinyl benzene, N-methylene-bis-acrylamide, ethylene glycol diacrylate, ethylene glycol dimethacrylate, 1,6-hexanediol diacrylate, and the like.

The copolymers of the invention are prepared by conventional emulsion polymerization techniques using the monomers as described above and at least one surfactant selected from anionic, nonionic, and cationic. The polymerization can be carried out in continuous, semi-continuous or batch. The polymerization reaction is preferably initiated at 40° C. to 90° C., more preferably 75° C. to 85° C. In general, any free radical initiator may be used. Such free radical initiators are known in the art and include ammonium persulfate, potassium persulfate, t-butyl hydroperoxide/bisulfite, hydrogen peroxide with a ferrous compound, and azo initiators such as azobisisovaleronitrile.

Although the solids content and viscosity of the emulsion can vary typical total solids content which is defined as the nonvolatile components of the emulsion is in the range of from about 1 to about 50 weight percent, preferably 20 to 40 weight percent, based on the total weight of the emulsion.

The copolymers of the invention are prepared as described above and added to an aqueous composition at a pH of from about 2 to about 5 to form an aqueous copolymer dispersion. At this low pH, the copolymer is present in the form of discrete, water insoluble particles, having an average particle size of about 0.1 to 5 microns, and an average molecular weight of from about 100,000 to about 5,000,000, preferably from about 500,000 to about 1,000,000.

Upon addition of an alkaline material to the aqueous copolymer dispersion, at least some of the residual carboxyl groups on the copolymer are neutralized at a pH of at least about 5.5 which allows the copolymer to become water soluble and substantially thicken the aqueous composition. Suitable alkaline materials include alkali metal hydroxide, sodium carbonate, or other bases such as ammonium hydroxide, methylamine or diethylamine. The hydrophobe-containing alkali soluble or swellable thickened aqueous composition exhibits constant or increased viscosity at temperatures approaching 120° C.

The copolymer of the invention may be formulated with such additives as are commonly incorporated into hydrophobe-containing alkali soluble or swellable thickened aqueous compositions. Such additives include fillers, pigments, dyes, softeners, surfactants, binders such as ethylene vinyl acetate and styrene-butadiene, alkali, and freeze point depressants. Examples of freeze thaw depressants are lower molecular weight alcohols and glycols such as methanol, ethanol, isopropanol, butanol, ethylene glycol, propylene glycol, butylene glycol, diethylene glycol, ethylene glycol monoethylether, ethylene glycol dimethyl ether, and the like. A combination of additives may also be used.

The emulsion copolymer of the invention may optionally be dried by a variety of methods such as tray drying, spray drying, drum drying, freeze drying, and precipitation and recovery followed by tray or fluidized bed drying. Additionally, the emulsion copolymer of the invention can be dried onto a variety of particulate substrates such as silica, kaolin, lignite, bentonite and other clays, and weighting materials normally utilized in various applications. The purpose of using such substrates is to enable delivery of dry products capable of rapid mixing and dispersion in various applications where the support material is compatible with the desired composition.

The hydrophobically-modified alkali-swellable copolymers of the invention are stable and are useful as thickeners in a variety of aqueous compositions. The copolymers may be used alone or in combination with other polymeric thickeners, dispersants, and gelling agents. Examples of aqueous compositions include, but are not limited to, paper coatings, sizing of paper and textiles, paints, carpet, oil drilling and recovery applications, thickener for brine solutions, bentonite extenders, dye solutions, cosmetics, detergent, adhesive, textile print paste, adhesives, coatings, drilling fluids, cleaners, walljoint compounds, lotions and other personal care products, highly absorbant applications, wall paper adhesives, and textile sizings.

The following nonlimiting examples illustrate further aspects of the invention.

EXAMPLE 1

Preparation of Surfactant Monomer α-(3-carboxy-1-oxo-3-butenyl)-ω-(docosyloxy)-poly(oxy-1,2-ethanediyl) Also Known as docosyloxypoly (oxyethylene)$_{25}$itaconate A mixture of 0.175 moles of docosyloxy poly (oxyethylene)$_{24}$ ethanol, 150 g toluene, 0.5 g of methyl ether of hydroquinane (MEHQ) was charged to a 500 ml reaction flask equipped with a thermometer, mechanical stirrer, heating mantel and Dean and Stark separator. The mixture was heated to reflux to remove any residual water in the surfactant. The mixture was cooled to 70° C. when 0.175 moles of methylene succinic acid were added and allowed to stir until dissolved. Then 1.0 g of para toluene sulfonic acid (TSA) was added and the mixture was again heated to reflux. After 4 hours, 95% of the theoretical amount of water had been removed and the toluene was removed in vacuo. The product cooled to a white wax that was used without purification.

EXAMPLE 2

Preparation of a Copolymer Containing docosyloxypoly(oxyethylene)$_{25}$itaconate, methacrylic acid and ethyl acrylate In a reactor fitted with a condenser, thermometer, heating mantle, and two addition funnels, was added 200 grams of water and 5 grams of a 30% solution of sodium lauryl sulfate. The reactor was heated to 80° C. while agitation was applied. A reaction mixture containing 10 grams of docosyloxypoly(oxyethylene)$_{25}$ itaconate monomer prepared in Example 1, 115 grams of methacrylic acid, 114 grams of ethyl acrylate, 5 grams of a 30% solution of sodium lauryl sulfate, and 341 grams of water were added to a first addition funnel. An initiator solution containing 0.54 grams of ammonium persulfate and 10 grams of water was added to a second addition funnel. The mixtures in the reaction funnels were slowly added to the reactor during a period of 90 minutes while the reaction temperature was maintained at 80 to 85° C. The temperature of the reactor was maintained at 80 to 85° C. for 1 hour.

The resulting emulsion copolymer was cooled and filtered through a 40 mesh screen wherein less than 0.01% residue was collected on the screen. The filtrate had a 30% solids content and the pH thereof was determined to be about 2.5. A 0.5% solids solution was prepared and the pH was increased pH 9.0 with NaOH, provided a viscosity of 8,850 cps at 25° C. (#3 spindle at 10 RPM Brookfield RVT).

EXAMPLE 3

Preparation of a Copolymer Containing docosyloxypoly(oxyethylene)$_{25}$itaconate, methacrylic acid, ethyl acrylate and styrene A copolymer was prepared according to the method described in Example 2, except that 25% of the ethyl acrylate was substituted with styrene.

The resulting emulsion copolymer was cooled and filtered through a 40 mesh screen wherein less than 0.01% residue was collected on the screen. The filtrate had a 30% solids content and the pH thereof was determined to be about 2.5. A 1.0% solids solution was prepared and the pH was increased pH 9.0 with NaOH, provided a viscosity of 38,000 cps at 25° C. (#6 spindle at 10 RPM Brookfield LVT).

EXAMPLE 4

Preparation of a Monofunctional Nonionic Urethane Monomer

A total of 103.5 grams (0.1050 moles) of polyglycol BL50-1500 (1,500 mol. wt. monohydric, poly(butylene oxide) poly(ethylene oxide) surfactant), commercially available from Dow Chemical Company, is slowly heated in a 1-liter reactor fitted with a thermometer, stirrer, reflux condenser, and heating mantle. When the temperature of the surfactant reaches 55° C., 0.206 grams of a monomethyl ether of hydroquinone and 0.200 grams of stannous octoate are added. The solution is maintained at 55° C. and 21.14 grams (0.1035 mole) of alpha,alpha-dimethyl-m-isopropenyl benzyl isocyanate (TMI) available from American Cyanamid Corporation, is added dropwise from an addition funnel over about a 45 minute period while the reaction mixture is maintained at 55° C. to 60° C. The reaction mixture is cooked for 2 hours at 57° C.

EXAMPLE 5

Preparation of a Copolymer Containing Monofunctional Nonionic Urethane Monomer

A mixture of 198.5 grams of water and 6.1 grams of sodium lauryl sulfate was charged to a 1-liter reactor fitted with a thermometer, stirrer, condenser, and heating mantle. A pre-emulsion of monomers is prepared in a beaker by mixing 262.7 grams of water, 22.8 grams of urethane monomer prepared in Example 4, 91.4 grams (1.06 moles) methacrylic acid, 114.1 grams (1.14 moles) ethyl acrylate, 262.1 grams water and 6.1 grams of sodium lauryl sulfate. The reactor charge is heated to 80° C. and 0.44 grams potassium persulfate in 48.46 grams of water is added. The monomer pre-emulsion is added from an addition funnel at constant rates over 90 minutes while maintaining the reaction mixture at 80° C. The latex formed is cooked at 88° C. for 1 hour.

The copolymer was cooled and filtered through a 40 mesh screen wherein less than 0.01% residue was collected on the screen. The filtrate had a 30% solids content and the pH thereof was determined to be about 2.5. A 3.0% solids solution was prepared and the pH was increased pH 9.0 with NaOH, provided a viscosity of 2200 cps at 25° C. and 3600 cps at 66° C. (#6 spindle at 10 RPM Brookfield LVT).

COMPARATIVE EXAMPLE 6

In a reactor fitted with a condenser, thermometer, heating mantle, and two addition funnels, was added 200 grams of water and 5 grams of a 30% solution of sodium lauryl sulfate. The reactor was heated to 80° C. while agitation was applied. A reaction mixture containing 10 grams of heptadecyl poly(oxyethylene)$_{19}$ itaconate monomer having a cloud point of 56° C. was prepared according to the procedure set forth in Example 1, except that a molar equivalent of heptadecyl poly(oxyethylene)$_{25}$ itaconate monomer was substituted for docosyloxypoly(oxyethylene)$_{25}$itaconate.

The resulting emulsion copolymer was cooled and filtered through a 40 mesh screen wherein less than 0.01% residue was collected on the screen. The filtrate had a 30% solids content and the pH thereof was determined to be about 2.5. A 1.0% solids solution was prepared and the pH was increased pH 9.0 with NaOH, provided a viscosity of 19,000 cps at 25° C. (#6 spindle at 10 RPM Brookfield LVT).

COMPARATIVE EXAMPLE 7

In a reactor fitted with a condenser, thermometer, heating mantle, and two addition funnels, was added 200 grams of water and 5 grams of a 30% solution of sodium lauryl sulfate. The reactor was heated to 80° C. while agitation was applied. A reaction mixture containing 10 grams of polyoxyethylene 49 di nonylphenol itaconate monomer having a cloud point of 97° C. was prepared according to the procedure set forth in Example 1, except that a weight percent basis of polyoxyethylene 49 di nonylphenol itaconate monomer was substituted for docosyloxypoly(oxyethylene)$_{25}$ itaconate.

The resulting emulsion copolymer was cooled and filtered through a 40 mesh screen wherein less than 0.01% residue was collected on the screen. The filtrate had a 30% solids content and the pH thereof was determined to be about 2.5. A 1.0% solids solution was prepared and the pH was increased pH 9.0 with NaOH, provided a viscosity of 870 cps at 25° C., 550 cps at 38° C., 240 cps at 54° C., and 165 cps at 66° C. (#6 spindle at 10 RPM Brookfield LVT). A 3.0% solids solution was prepared and the pH was increased pH 9.0 with NaOH, provided a viscosity of 2830 cps at 25° C., 2740 cps at 38° C., 1550 cps at 54° C., and 1080 cps at 66° C. (#6 spindle at 10 RPM Brookfield LVT).

COMPARATIVE EXAMPLE 8

ACCUSOL TT-935 which is commercially available from Rohm & Haas, is a hydrophobe-containing alkali soluble or swellable copolymer thickener prepared from an acrylate ester linked associative monomer having a cloud point of less than 65° C., ethyl acrylate and methacrylic acid.

POLYPHOBE 206 which is commercially available from Union Carbide, is a hydrophobe-containing alkali soluble or swellable copolymer thickener prepared from an urethane linked associative monomer, having a cloud point of less than 65° C., ethyl acrylate and methacrylic acid.

ACCUSOL TT-935 and POLYPHOBE 206 were evaluated in paper coating formulations according to the procedure set forth in Example 9. The test results are summarized in FIG. 1.

EXAMPLE 9

Evaluation of Copolymers in Paper Coatings

The copolymer prepared in Example 2 was evaluated at different concentrations in a paper coating formulation. The paper coating formulation had the following ingredients:

| Ingredients | Parts |
|---|---|
| #2 Clay, English China Clay Betacote | 25 |
| Delaminated Clay, English China Clay | 75 |
| GENCORP SBR latex 5096 | 6.0 |
| Sunkote 455 Calcium St. | 1.5 |
| TOTAL | 107.5 |
| pH | 8.5 |
| Solids | 57.5 |

The viscosity of the copolymer was evaluated at different concentration levels and different dosage levels in the paper coating formulations. The test results are summarized in Table I. In addition, Table I contains comparative test data with no thickener added to the paper coating formulation, and comparative test data for alkali soluble or swellable thickener which are prepared with an associative monomer having a cloud point of less than 65° C.

TABLE 1

| SAMPLE | DOSAGE, % | BROOKFIELD VISCOSITY, 100 rpm | | |
|---|---|---|---|---|
| | | 25° C. | 38° C. | 54° C. |
| BLANK | — | 78.0 | 66.0 | 62.7 |
| COMP. EX. 6 | 0.3 | 1600 | 1120 | 1010 |
|  | 0.39 | 2120 | 1810 | 1640 |
| EX. 2 (1.9% Surfactant Monomer) | 0.23 | 1480 | 1480 | 1670 |
|  | 0.28 | 2040 | 2160 | 3220 |
| EX. 2 (3.0% Surfactant Monomer) | 0.24 | 1580 | 1540 | 1660 |
|  | 0.29 | 2020 | 2020 | 2320 |
| EX. 2 (4.0% Surfactant Monomer) | 0.28 | 1800 | 1720 | 2040 |
|  | 0.32 | 2280 | 2220 | 2550 |
| EX. 2 (4.0% Surfactant Monomer) | 0.25 | 1580 | 1520 | 1660 |
|  | 0.3 | 2180 | 2210 | 2370 |
| EX. 2 (6.0% Surfactant Monomer) | 0.23 | 1540 | 1530 | 1640 |
|  | 0.28 | 1990 | 2040 | 2220 |
| EX. 2 (10.0% Surfactant Monomer) | 0.3 | 1670 | 1720 | 1920 |
|  | 0.35 | 2260 | 2240 | 2740 |
| COMP. EX. 7 (1.9% Surfactant Monomer) | 0.3 | 1440 | 1120 | 1050 |
|  | 0.43 | 2340 | 1920 | 1870 |

The test results in Table I clearly show that paper coatings thickened with the copolymers of the present invention containing as low as 1.9% surfactant monomer exhibit increased viscosity from 25° C. to 38° and as high as 54° C. In addition, the results in Table I show that comparative thickeners which are prepared with surfactant monomers having a cloud point of less than 65° C. are ineffective at maintaining the viscosity of the paper coating.

In reference to the drawings, FIG. 1 is a graph which plots viscosity vs. temperature for a series of copolymers in the paper coating formulation as described above. The three copolymers are the copolymer prepared in Example 2 and the commercially available copolymers ACCUSOL TT-935 and POLYPHOBE 206. FIG. 1 clearly shows that the viscosity of the paper coating significantly increased as the temperature increased. In contrast, the viscosity of the paper coatings prepared with ACCUSOL TT-935 and POLYPHOBE 206 significantly decreased as the temperature was increased.

EXAMPLE 10

Preparation of Brine Solution Containing Copolymer Thickener of Example 3

The copolymer prepared in Example 3 was added to a 2.5% brine solution at a level of 0.25 weight percent. The viscosity of the resulting solution at 22° C. was 1290 cps (Spindle #3 at 20 rpm, RVT). The solution temperature was increased to 38° C. and the viscosity increased to 1800 cps (Spindle #3 at 20 rpm, RVT).

Figure 2:
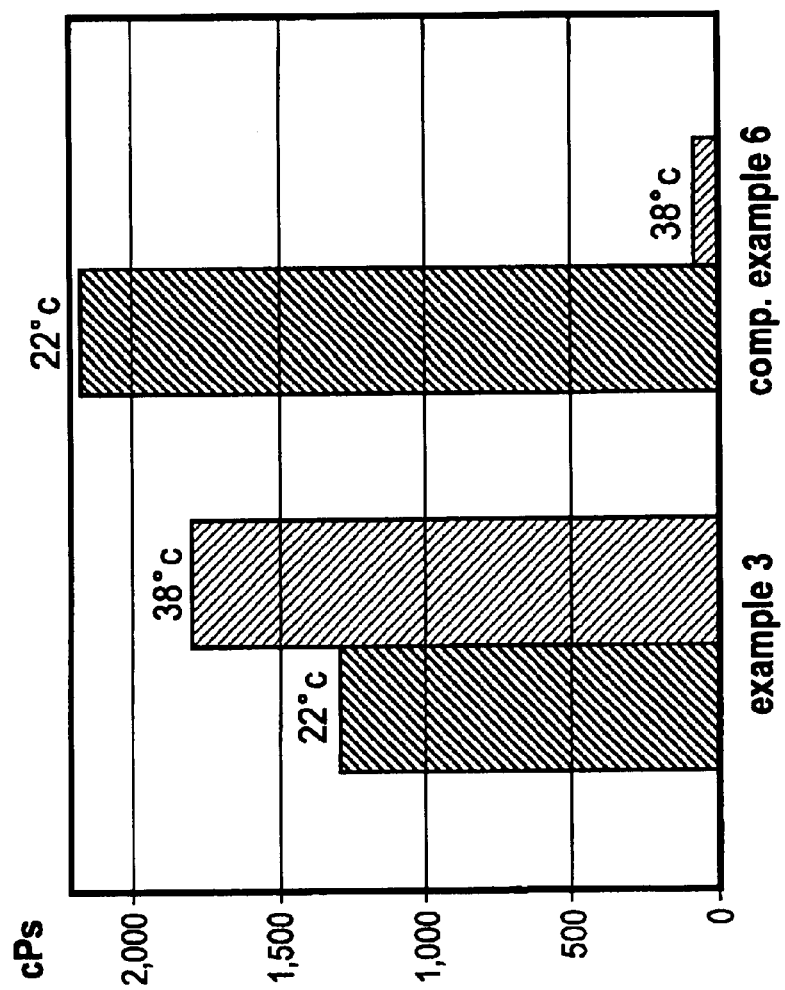
FIG. 2 is a bar graph which plots viscosity vs. temperature for a 0.25% concentration of copolymer of the invention in a 2.5% aqueous brine solution vs. A commercially available copolymer thickener.

In reference to the drawings, FIG. 2 is a bar graph which plots viscosity vs. temperature for the copolymer in the brine solution. FIG. 2 clearly shows that the viscosity of the brine solution containing the copolymer thickener prepared in Example 3 of the invention significantly increases as the temperature was increased from 22° C. to 38° C.

COMPARISON EXAMPLE 11

Preparation of Brine Solution Containing Copolymer Thickener of Comparative Example 6

The copolymer prepared in Comparative Example 6 was added to a 2.5% brine solution at a level of 0.25 weight percent. The viscosity of the resulting solution at 22° C. was 2180 cps (Spindle #3 at 20 rpm, RVT). The solution temperature was increased to 38° C. and the viscosity decreased to 83 cps (Spindle #3 at 20 rpm, RVT).

FIG. 2 is a bar graph which plots viscosity vs. temperature for the copolymer prepared in Comparative Example 6 in the brine solution. FIG. 2 clearly shows that the viscosity of the brine solution containing the copolymer prepared in Comparative Example 6 significantly decreased as the temperature was increased from 22° C. to 38° C.

The hydrophobe-containing alkali soluble or swellable copolymer thickeners of the invention thicken aqueous compositions and maintain or increase the viscosity of the thickened aqueous composition at temperatures approaching 120° C. Thus, the copolymer thickeners of the invention exhibit enhanced thickening efficiency in comparison with prior art copolymers. In addition, a reduced quantity of copolymer thickener is required to achieve a fixed level of thickening in comparison with the amount of prior art thickeners.

While the invention has been described with particular reference to certain embodiments thereof, it will be understood that changes and modifications may be made by those of ordinary skill in the art within the scope and spirit of the following claims.

What is claimed is:

1. A hydrophobe-containing alkali soluble or swellable copolymer thickener which provides aqueous compositions with constant or increased viscosity at temperatures approaching 120° C., wherein said copolymer comprises an emulsion polymerization product of:

(A) from about 0.1 to about 25 weight percent, based on the total weight of the copolymer, of an ethylenically unsaturated copolymerizable surfactant monomer having a cloud point of from about 65° C. to about 95° C., wherein the surfactant monomer has the formula $$M(EO)_x(BO)_zOR^1$$

wherein M is a residue selected from the group consisting of an ethylenically unsaturated carboxylic acid, and an ethylenically unsaturated dicarboxylic acid; EO is an ethylene oxide unit: BO is a butylene oxide unit, x is from 10 to 45; z is from 5 to 35; provided that x+z is from 20 to 45; and $R^1$ is selected from the group consisting of alkyl, alkylene, cycloalkyl, cycloalkylene, and arylalkyl group wherein the alkyl group has from 1 to 4 carbon atoms;

(B) from about 20 to about 70 weight percent, based on the total weight of the copolymer, of an α,β-ethylenically unsaturated monocarboxylic acid monomer having the formula $$CH_2=\underset{\underset{R^2}{|}}{C}-COOH$$

wherein $R^2$ is selected from the group consisting of hydrogen, an alkyl group having 1 to 4 carbon atoms, and —$CH_2COOR^3$; and $R^3$ is hydrogen or an alkyl group having 1 to 4 carbon atoms; and (C) from about 10 to about 70 weight percent, based on the total weight of the copolymer, of a nonionic α,β-ethylenically unsaturated monomer having the formula $$CH_2=CR^4R^5$$

wherein $R^4$ is selected from the group consisting of hydrogen, methyl and Cl; and $R^5$ is selected from the group consisting of CN, Cl, —$COOR^6$, —$C_6H_4R^7$, —$CH=CH_2$, $$-\underset{\underset{O}{\|}}{O}CR^6, \text{ and } -\underset{\underset{O}{\|}}{C}-NH_2;$$

wherein $R^6$ is selected from the group consisting of an alkyl group having 1 to 4 carbon atoms; $R^7$ is an alkyl group having 1 to 12 carbon atoms or a hydroxyalkyl group having 2 to 8 carbon atoms; and $R^8$ is an alkyl group having 1 to 8 carbon atoms.

2. The copolymer thickener according to claim 1 wherein the ethylenically unsaturated copolymerizable surfactant monomer (A) is present in an amount of from about 1 to about 10 weight percent, the α,β-ethylenically unsaturated monocarboxylic acid monomer (B) is present in an amount of from about 30 to about 60 weight percent, and the nonionic α,β-ethylenically unsaturated monomer (C) is present in an amount of from about 20 to about 50 weight percent, based on the total weight of the copolymer.

3. The copolymer thickener according to claim 2 wherein the ethylenically unsaturated copolymerizable surfactant monomer (A) is present in an amount of from about 2 to about 5 weight percent, the α,β-ethylenically unsaturated monocarboxylic acid monomer (B) is present in an amount of from about 40 to about 50 weight percent, and the nonionic α,β-ethylenically unsaturated monomer (C) is present in an amount of from about 30 to about 40 weight percent, based on the total weight of the copolymer.

4. The copolymer thickener according to claim 1 wherein in the formula for the ethylenically unsaturated copolymerizable surfactant monomer (A), x is an integer from about 20 to about 40.

5. The copolymer thickener according to claim 4 wherein in the formula for the ethylenically unsaturated copolymerizable surfactant monomer (A), x is an integer from about 20 to about 30.

6. The copolymer thickener according to claim 1 wherein in the formula for the ethylenically unsaturated copolymerizable surfactant monomer (A), M is the residue of methacrylic acid or itaconic acid.

7. The copolymer thickener according to claim 1 wherein the α,β-ethylenically unsaturated monocarboxylic acid monomer (B) is methacrylic acid.

8. The copolymer thickener according to claim 1 wherein the nonionic α,β-ethylenically unsaturated monomer (C) is ethyl acrylate.

9. The copolymer thickener according to claim 1 which further comprises from about 0.01 to about 1 weight percent, based on the total weight of the copolymer of a crosslinking monomer.

10. The copolymer thickener according to claim 9 wherein the crosslinking monomer is selected from the group consisting of diallylphthalate, vinyl crotonate, allyl methacrylate, divinyl benzene, N-methylene-bis-acrylamide, ethylene glycol diacrylate, ethylene glycol dimethacrylate, 1,6-hexanediol diacrylate, and combinations thereof.

11. The copolymer thickener according to claim 10 wherein the crosslinking monomer is diallylphthalate.

* * * * *